United States Patent [19]
Pierce

[11] Patent Number: 5,634,502
[45] Date of Patent: Jun. 3, 1997

[54] NO SPILL OIL FILLER

[76] Inventor: Michael L. Pierce, Rte. 3, Box 446, Madill, Okla. 73446

[21] Appl. No.: 581,847

[22] Filed: Jan. 2, 1996

[51] Int. Cl.$^6$ ................................................ B65B 3/06
[52] U.S. Cl. ...................... 141/98; 141/384; 141/331; 141/340; D7/700; D15/150
[58] Field of Search .................. 141/98, 331, 340–342, 141/383, 384, 386; D7/700; D15/150–152

[56] References Cited

U.S. PATENT DOCUMENTS

| | | |
|---|---|---|
| 238,774 | 3/1881 | Fletcher. |
| D. 341,149 | 11/1993 | Pollak ............................ 141/340 X |
| 529,998 | 11/1894 | Beall. |
| 760,069 | 5/1904 | Hunter ............................ 141/331 |
| 1,174,553 | 3/1916 | Errington ........................ 141/340 |
| 2,791,148 | 5/1957 | Maishch ......................... D7/700 |
| 3,885,547 | 5/1975 | Doepke et al. .................. 141/342 X |
| 3,990,489 | 11/1976 | Ruter ............................ 141/98 |
| 4,338,983 | 7/1982 | Hatcher ......................... 141/331 |
| 4,703,867 | 11/1987 | Schoenhard ..................... 141/98 X |
| 4,896,746 | 1/1990 | Desjardins ...................... 141/98 X |
| 5,316,059 | 5/1994 | Lahnan et al. .................. 141/340 |
| 5,322,099 | 6/1994 | Langlois ........................ 141/98 X |
| 5,402,835 | 4/1995 | Middleton ...................... 141/331 |
| 5,472,025 | 12/1995 | Conrad et al. .................. 141/331 X |

FOREIGN PATENT DOCUMENTS 2177383  1/1987  United Kingdom ................ 141/331

*Primary Examiner*—J. Casimer Jacyna
*Attorney, Agent, or Firm*—Michael I. Kroll

[57] ABSTRACT

A no spill oil filler (20) for an oil access opening (16) in an engine (12) of a motor vehicle (14). The no spill oil filler (20) comprises a component (22) for catching and directing a downward flow of motor oil (10) poured from an oil can (18). A structure (24) is for mounting the catching and directing component (22) into the oil access opening (16) in the engine (12) of the motor vehicle (14).

1 Claim, 2 Drawing Sheets

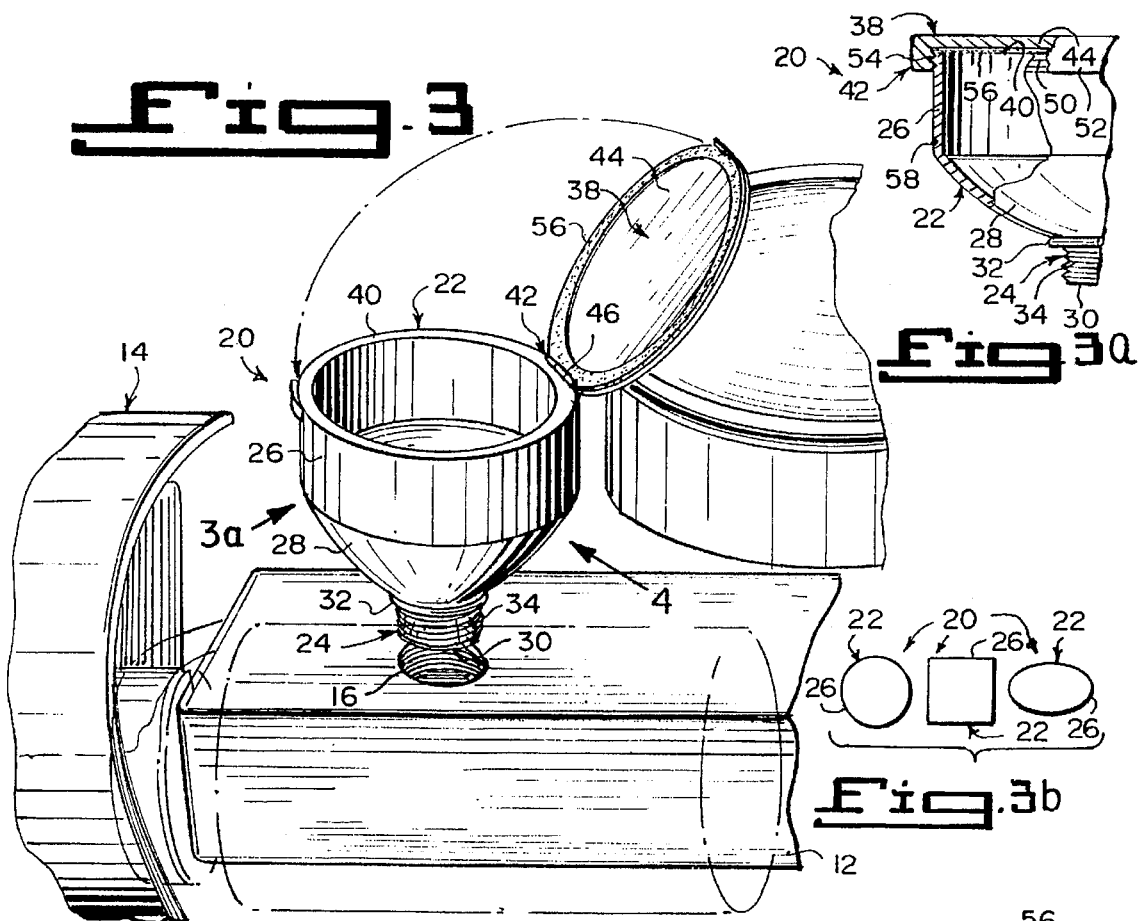
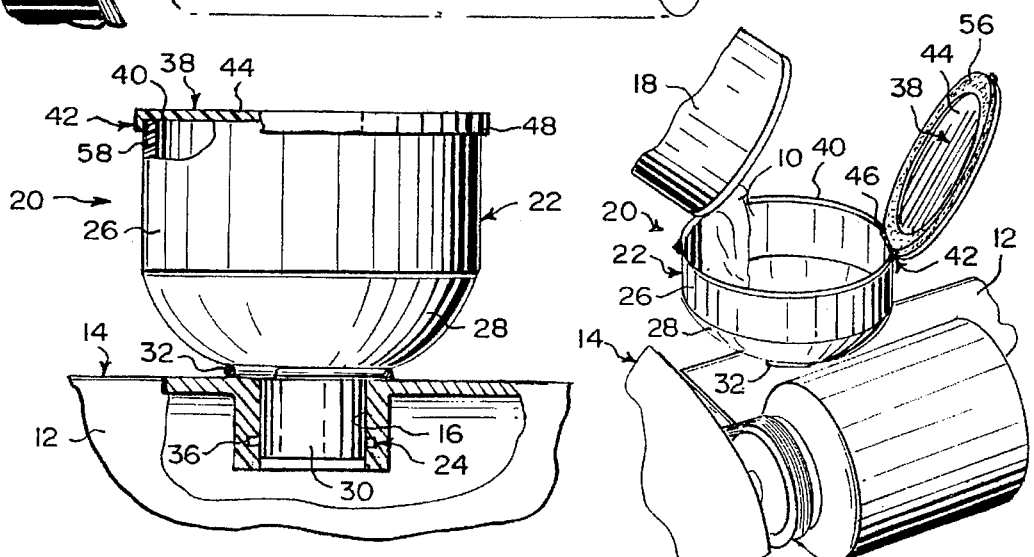

NO SPILL OIL FILLER

BACKGROUND OF THE INVENTION

1. Field of the Invention

The instant invention relates generally to funnels and more specifically it relates to a no spill oil filler.

2. Description of the Prior Art

Numerous funnels have been provided in prior art. For example, U.S. Pat. Nos. 238,774 to Fletcher; 529,998 to Beall; 4,338,983 to Hatcher and 5,316,059 to Lahnan et al. all are illustrative of such prior art. While these units may be suitable for the particular purpose to which they address, they would not be as suitable for the purposes of the present invention as heretofore described.

FLETCHER, JOSEPH A.

FUNNEL FOR USE IN CANNING FRUIT, ETC.

U.S. Pat. No. 238,774

The invention relates to a funnel, more especially intended for use in filling fruit cans and jars. It consists, first, in providing the funnel with a lateral extension to arrest a drip from a ladle or dipping instrument and second, in inclining the extension so that the drip shall be caused to flow therefrom into the vessel. when filling jars or cans in the ordinary manner, the drippings from the ladle fall between a kettle and the jar and upon the outside of the latter and are a source of great annoyance and considerable waste. When the device is used the waste is prevented, the material returned to the kettle, and the jar left in a clean, unsoiled condition.

BEALL, CHARLES W.

FUNNEL

U.S. Pat. No. 529,998

A funnel which is adapted to close automatically when a vessel which is being filled is full. The funnel is particularly adapted for filling lamps having opaque sides, but which may be used for filling any other receptacle and when the receptacle becomes nearly full, closes automatically so as to prevent running over the receptacle and spilling a liquid.

HATCHER, FLOYD J.

OIL CAP WITH SELF CONTAINED FUNNEL

U.S. Pat. No. 4,338,983

An oil cap having a self contained funnel is the subject of the present invention. The oil cap is inserted into the engine oil port in place of a conventional cap. An opening in the cap receives a neck portion which extends upwardly and in turn receives a funnel portion. The funnel portion is provided with a cover which may be removed to add engine oil.

LAHNAN, ROBERT A.

DIEHL, RAYMOND L.

OIL FILLER FUNNEL CAP

U.S. Pat. No. 5,316,059

An improvement in an oil filler funnel cap that replaces the normal oil filler cap on internal combustion engines. The improved filler funnel cap is adjustable to fit a variety of different size oil filler openings forming an enlarged funnel receptacle with a resilient sealing closure.

SUMMARY OF THE INVENTION

A primary object of the present invention is to provide a no spill oil filler that will overcome the shortcomings of the prior art devices.

Another object is to provide a no spill oil filler that is mounted to an oil access opening in an engine, so that engine oil can be safely added to the engine.

An additional object is to provide a no spill oil filler that will prevent oil spills, thereby keeping the engine cleaner, so that less dirt and dust will collect on the engine making the engine run cooler.

A further object is to provide a no spill oil filler that is simple and easy to use.

A still further object is to provide a no spill oil filler that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a perspective view showing the instant invention ready to be mounted into the oil access opening in the engine.

FIG. 3a is an elevational view of the instant invention per se taken in the direction of arrow 3a in FIG. 3, with parts broken away and in section.

FIG. 3b is a diagrammatic top view showing various geometric configurations for the instant invention.

FIG. 4 is an elevational view taken in the direction of arrow 4 in FIG. 3, showing the instant invention mounted into the oil access opening in the engine with parts broken away and in section.

FIG. 5 is a perspective view showing the instant invention mounted into the oil access opening in the engine with oil being poured from an oil can therein.

Similar reference characters denote corresponding features consistently throughout the attached drawings.

DETAILED DESCRIPTION OF THE PREFERRED EMBODIMENTS

Figure 1:
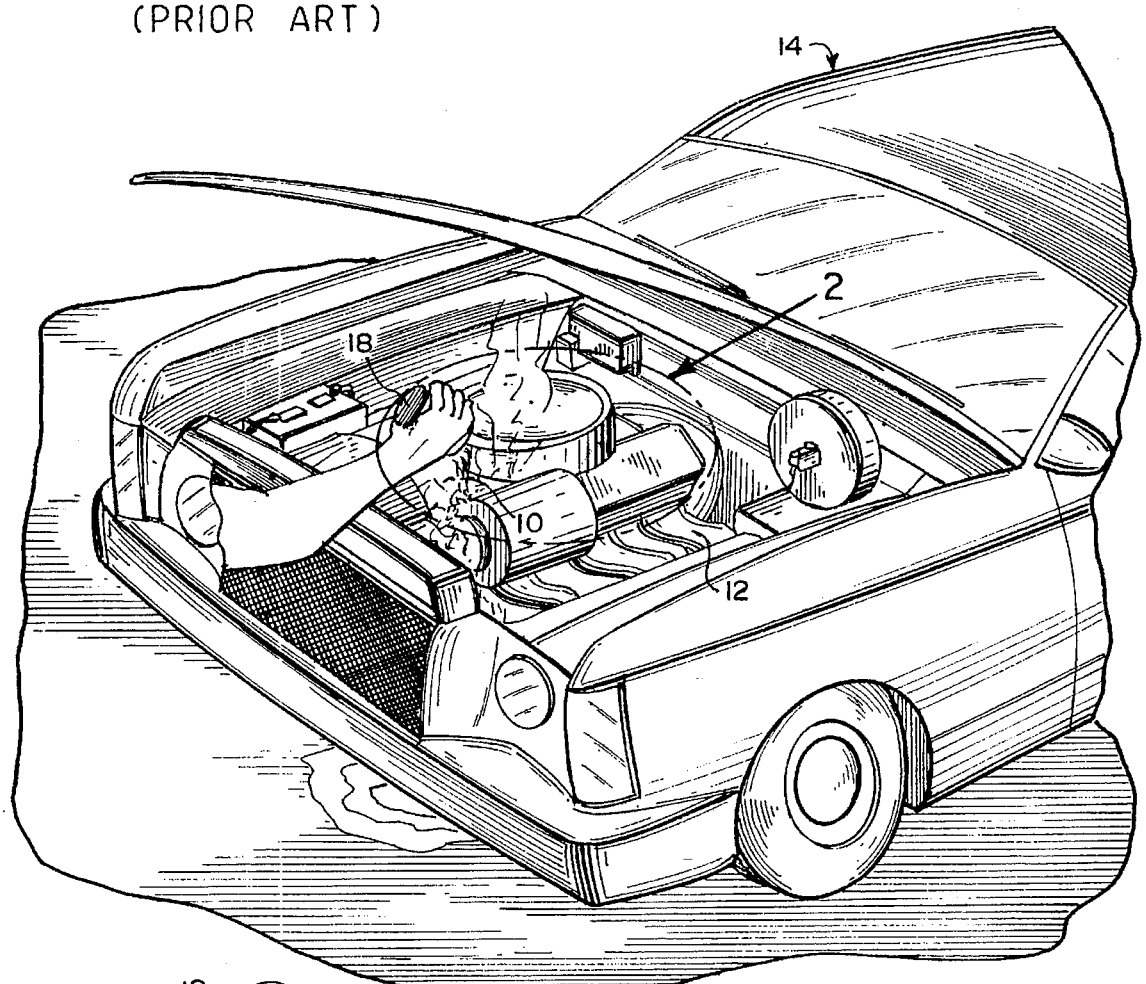
FIG. 1 is a perspective view of the prior art showing oil spilling all over an engine of a motor vehicle, when being poured into an oil access opening in the engine.
Figure 2:
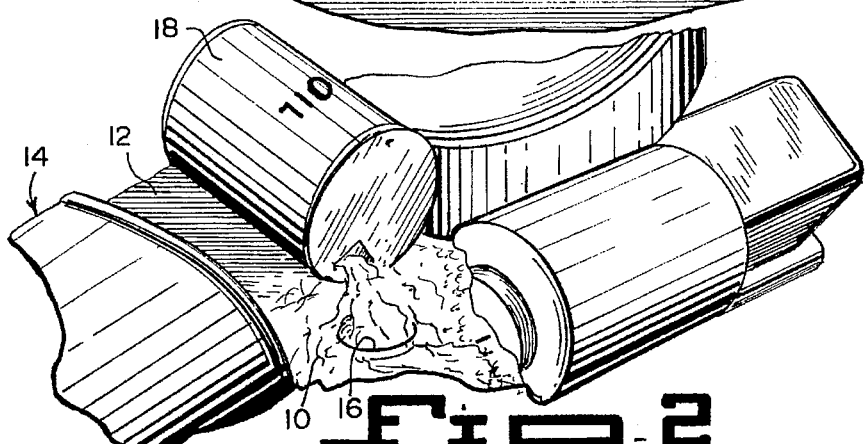
FIG. 2 is an enlarged perspective view of the prior art as indicated by arrow 2 in FIG. 1, showing the oil spill in greater detail.

Turning now descriptively to the drawings, in which similar reference characters denote similar elements throughout the several views, FIGS. 1 and 2 illustrate the prior art, in which motor oil 10 is spilling all over an engine 12 of a motor vehicle 14 when being poured into an oil access opening 16 in the engine 12 from an oil can 18.

FIGS. 3 through 5 show the instant invention which is a no spill oil filler 20 for the oil access opening 16 in the engine 12 of the motor vehicle 14. The no spill oil filler 20 comprises a component 22 for catching and directing a downward flow of the motor oil 10 poured from the oil can 18. A structure 24 is for mounting the catching and directing component 22 into the oil access opening 16 in the engine 12 of the motor vehicle 14.

The catching and directing component 22 includes a body portion 26. A tapered base portion 28 is integral with and extends downwardly from the body portion 26. A tubular spout portion 30 is integral with and extends downwardly from the tapered base portion 28.

An O-ring 32 fits about the tubular spout 30 up against the tapered base portion 28, so as to prevent the motor oil 10 from leaking out of the oil access opening 16 in the engine 12 of the motor vehicle 14. The mounting structure 24, shown in FIGS. 3 and 3a, consists of the tubular spout portion 30 having external threads 34. The tubular spout portion 28 can be threaded into the oil access opening 16 in the engine 12 of the motor vehicle 14.

The mounting structure 24, shown in FIG. 4, can also be a locking device 36 between the oil access opening 16 and the tubular spout portion 30. The tubular spout 30 can be inserted into the oil access opening 16 in the engine 12 of the motor vehicle 14, then turned and locked in place.

An element 38 is provided, for covering an open top edge 40 of the body portion 26. A facility 42 is for attaching the covering element 38 in a removable manner to the open top edge 40 of the body portion 26, so as to prevent contaminants from entering into the body portion 26 when not in use.

The covering element 38 is a lid 44 sized to fit over the open top edge 40 of the body portion 26. The body portion 26 can be cylindrical shaped, as shown in FIGS. 3 through 5. The body portion 26 can also be square shaped, or oblong shaped, as shown in FIG. 3b.

The attaching facility 42 can be a hinge 46 between the lid 44 and the open top edge 40 of the body portion 26, as shown in FIGS. 3 and 5. The attaching facility 42 can also be a flange 48 extending down from the lid 44, which snap fits over the open top edge 40 of the body portion 26, as shown in FIG. 4.

The attaching facility 42 can also consist of the body portion 26 having external threads 50 adjacent the open top edge 40 thereof. The lid 44 has a collar 52 with internal threads 54, which can be threaded onto the external threads 50, as shown in FIG. 3a.

A gasket 56 can be affixed to the underside of the lid 44, as shown in FIGS. 3, 3a and 5. When the lid 44 is closed over the open top edge of the body portion 26, the gasket 56 will help keep out the contaminant.

The body portion 26, the tapered base portion 28, the tubular spout portion 30 and the lid are all fabricated out of a durable material 58. The durable material 58 is heavy plastic, as shown in FIG. 4, or light metal, as shown in FIG. 3a.

LIST OF REFERENCE NUMBERS 10 motor oil
12 engine
14 motor vehicle
16 oil access opening
18 oil can
20 no spill oil filler
22 catching and directing component of 20
24 mounting structure of 20
26 body portion of 22
28 tapered base portion of 22
30 tubular spout portion of 22
32 O-ring on 30
34 external threads for 24 on 30
36 locking device for 24 between 16 and 30
38 covering element
40 open top edge of 26
42 attaching facility
44 lid for 38
46 hinge for 42
48 flange for 42
50 external threads on 26 of 42
52 collar of 42
54 internal threads on 52
56 gasket on 44
58 durable material It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A no spill oil filler for an oil access opening in an engine of a motor vehicle comprising:

a) means for catching and directing a downward flow of motor oil poured from an oil can comprising a cylindrical body portion, a base portion integral with and having a taper the whole length extending downwardly directly from said body portion, and a tubular spout portion integral with and extending downwardly directly from the taper of said base portion forming an annular intersection of said taper and said tubular spout portion;

b) means for mounting said catching and directing means into the oil access opening in the engine of the motor vehicle including said tubular spout portion having external threads for threading into the oil access opening in said engine, an o-ring of circular cross section on the outside of said tubular spout portion up against said base portion at the intersection of said taper and tubular spout portion to prevent the motor oil from leaking out of the oil access opening in said engine; and c) means comprising a lid for covering an open top edge of said body portion, a hinge being mounted between said lid and the open top edge of said body portion for permitting said lid to be opened for oil to be inserted and closed at other times, and a gasket affixed to the underside of said lid to prevent contaminants from entering said engine when said lid is closed.

* * * * *